US012142885B2

(12) United States Patent
De Bruijn et al.

(10) Patent No.: US 12,142,885 B2
(45) Date of Patent: Nov. 12, 2024

(54) PLUG INSERT FOR A CONNECTOR ASSEMBLY AND CONNECTOR ASSEMBLY

(71) Applicants: TE Connectivity Germany GmbH, Bensheim (DE); TE Connectivity Nederland BV, s'Hertogenbosch (NL)

(72) Inventors: Jeroen De Bruijn, Loon op Zand (NL); Martin Szelag, Bickenbach (DE); Wijnand Van Gils, Raamsdonksveer (NL); Franz Mueller, Griesheim (DE); Ulrich Buchmann, Eppertshausen (DE); Mike Laub, Bensheim (DE)

(73) Assignees: TE Connectivity Nederland BV, s'Hertogenbosch (NL); TE Connectivity Germany GmbH, Bensheim (DE)

(*) Notice: Subject to any disclaimer, the term of this patent is extended or adjusted under 35 U.S.C. 154(b) by 254 days.

(21) Appl. No.: 17/561,320

(22) Filed: Dec. 23, 2021

(65) Prior Publication Data

US 2022/0158365 A1 May 19, 2022

Related U.S. Application Data

(63) Continuation of application No. PCT/EP2020/067373, filed on Jun. 22, 2020.

(30) Foreign Application Priority Data

Jun. 24, 2019 (EP) .................................... 19182078

(51) Int. Cl.

| | |
|---|---|
| ***H01R 4/2433*** | (2018.01) |
| ***H01R 13/50*** | (2006.01) |
| ***H01R 13/506*** | (2006.01) |

(52) U.S. Cl.
CPC ......... *H01R 4/2433* (2013.01); *H01R 13/501* (2013.01); *H01R 13/506* (2013.01)

(58) Field of Classification Search
None
See application file for complete search history.

(56) References Cited

U.S. PATENT DOCUMENTS 3,890,029 A 6/1975 Izraeli
4,190,952 A * 3/1980 Thomas ............... H01R 12/675 29/749

(Continued)

FOREIGN PATENT DOCUMENTS

CN 1835300 A 9/2006
CN 102246360 A 11/2011

(Continued)

OTHER PUBLICATIONS

Office Action from the Japanese Patent Office dated Dec. 13, 2022, corresponding to Application No. 2021-576261 with English translation, 12 pages.

(Continued)

*Primary Examiner* — Oscar C Jimenez
(74) *Attorney, Agent, or Firm* — Barley Snyder

(57) ABSTRACT

A plug insert comprises a plug insert body including at least one contact member accessible from outside the plug insert, at least one insulation displacement contact electrically connected to the contact member, and a guiding assembly. At least one wire manager module includes at least one cable receptacle for receiving and holding a cable or wire. The guiding assembly guides the wire manager module relative to the plug insert body from a pre-assembly position, to an assembly position in which the insulation displacement contact extends into the cable receptacle.

17 Claims, 8 Drawing Sheets

(56) References Cited

U.S. PATENT DOCUMENTS

| | | | | | |
|---|---|---|---|---|---|
| 4,508,399 | A * | 4/1985 | Dowling | H01R 12/616 439/71 |
| 4,822,299 | A | 4/1989 | Rider, Jr. | |
| 5,573,430 | A | 11/1996 | Hatagishi et al. | |
| 6,224,423 | B1 | 5/2001 | Yip et al. | |
| 6,254,420 | B1 | 7/2001 | Letailleur et al. | |
| 6,666,706 | B1 * | 12/2003 | Jones | H01R 12/675 439/353 |
| 7,249,979 | B2 | 7/2007 | Gerber et al. | |
| 7,845,968 | B1 * | 12/2010 | Huss, Jr. | H01R 4/2404 439/417 |
| 8,298,922 | B2 | 10/2012 | Schumann et al. | |
| 8,573,999 | B2 | 11/2013 | Feldner et al. | |
| 10,542,632 | B2 | 1/2020 | Kim et al. | |
| 11,355,888 | B2 | 6/2022 | Zeng et al. | |
| 2006/0183359 | A1 * | 8/2006 | Gerber | H01R 4/2429 439/76.1 |
| 2008/0076295 | A1 * | 3/2008 | Lappoehn | H01R 12/675 439/460 |
| 2011/0300740 | A1 * | 12/2011 | Schumann | H01R 13/5829 439/452 |
| 2012/0178282 | A1 | 7/2012 | Engels et al. | |
| 2012/0252535 | A1 | 10/2012 | Kajiwara et al. | |
| 2015/0056824 | A1 | 2/2015 | Bolouri-Saransar et al. | |
| 2017/0012374 | A1 | 1/2017 | Riccardi | |
| 2018/0035532 | A1 | 2/2018 | Chen | |
| 2019/0229438 | A1 * | 7/2019 | Naganuma | H01R 13/506 |

FOREIGN PATENT DOCUMENTS

| | | | |
|---|---|---|---|
| CN | 105517339 | A | 4/2016 |
| CN | 107086384 | A | 8/2017 |
| CN | 107454742 | A | 12/2017 |
| CN | 110086034 | A | 8/2019 |
| DE | 202008000941 | U1 | 3/2008 |
| DE | 202008000942 | U1 | 3/2008 |
| DE | 202009107572 | U1 | 4/2010 |
| DE | 102012106476 | A1 | 6/2014 |
| EP | 0856912 | A2 | 8/1998 |
| EP | 0969553 | A1 | 1/2000 |
| EP | 0982815 | A2 | 3/2000 |
| EP | 2843913 | A1 | 3/2015 |
| JP | H864263 | A | 3/1996 |
| JP | H8203600 | A | 8/1996 |
| JP | 2011222503 | A | 11/2011 |
| JP | 2014175052 | A | 9/2014 |
| JP | 201921462 | A | 2/2019 |

OTHER PUBLICATIONS

PCT Notification, The International Search Report and The Written Opinion of the International Searching Authority, International Application No. PCT/EP2020/067373, dated Aug. 31, 2020, 14 pages.

Extended European Search Report, Application No. 19182078.6-1201, dated Dec. 10, 2019, 8 pages.

Examination Report dated Nov. 7, 2023, corresponding to Application No. 19 182 078.6-1201, 6 pages.

Chinese First Office Action dated Dec. 21, 2023 with English translation, corresponding to Application No. 202080045411.6, 16 pages.

* cited by examiner

PLUG INSERT FOR A CONNECTOR ASSEMBLY AND CONNECTOR ASSEMBLY

CROSS-REFERENCE TO RELATED APPLICATIONS

This application is a continuation of PCT Application No. PCT/EP2020/067373 filed on Jun. 22, 2020, claiming benefit to EP Application No. 19182078.6 filed on Jun. 24, 2019.

FIELD OF THE INVENTION

The present disclosure relates to electrical connectors, and more particularly, a plug insert for use with an electrical connector.

BACKGROUND

In data transmission applications, data lines are in general terminated and electrically contacted by means of insulation displacement contacts (IDC). A plug insert or cable termination unit may provide an interface means between the data lines and contacts of the connector assembly. However, prior art solutions may not provide a reliable contact between the IDC and a cable or wire. Existing solutions also suffer from insufficient position accuracy of both the components of the plug insert, as well as with the conductors associated therewith.

An aspect of the present disclosure, therefore, is to provide a plug insert and a connector assembly which achieve reliable contact between the IDC and a cable or wire, as well as a high degree of positional accuracy.

SUMMARY

A plug insert according to an embodiment of the present disclosure comprises a plug insert body including at least one contact member accessible from outside the plug insert and at least one insulation displacement contact electrically connected to the contact member, and a guiding assembly. At least one wire manager module includes at least one cable receptacle for receiving and holding a cable or wire. The guiding assembly guides the wire manager module relative to the plug insert body from a pre-assembly position, to an assembly position in which the insulation displacement contact extends into the cable receptacle.

BRIEF DESCRIPTION OF THE DRAWINGS

The invention will now be described by way of example with reference to the accompanying Figures, of which.

DETAILED DESCRIPTION OF THE EMBODIMENTS

Figure 1:
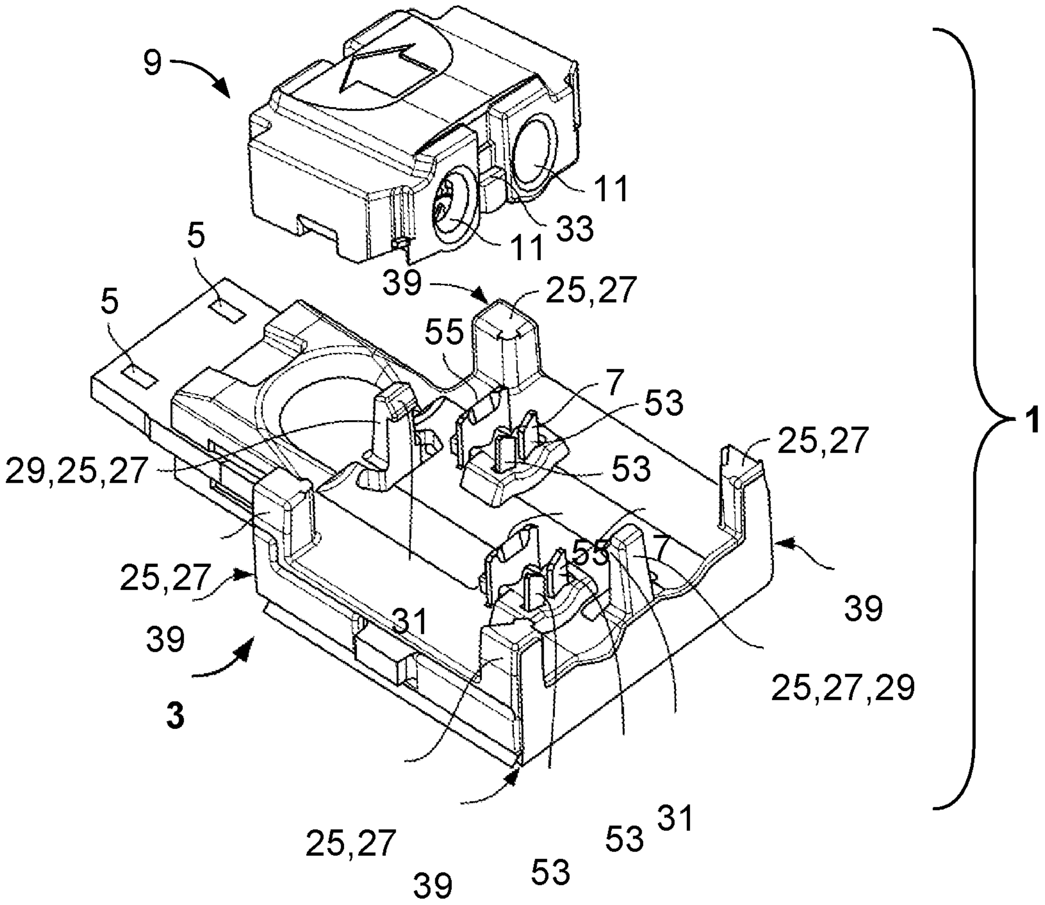
FIG. 1 is an exploded view of a plug insert according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is an exploded view of a first embodiment of a plug insert 1 according to the present disclosure. In the exemplary embodiment, the plug insert 1 comprises a plug insert body 3 including two contact members 5 that are accessible from outside the plug insert. The plug insert body 3 further comprises two IDCs 7 which are electrically connected to the two contact members 5. The plug insert 1 further comprises a wire manager module 9 with two cable receptacles 11 for receiving and holding a cable or wire (not shown). It should be understood that in different embodiments, a different number of IDCs 7 and contact members 5 may be provided. The abbreviation 'IDC' denotes a single insulation displacement contact or a plurality of two, three, four or more of such contacts. The generally rectangular shape of the plug insert body 3 and the wire manager module 9 are exemplary for the embodiment shown, and different shapes are possible.

Figure 2:
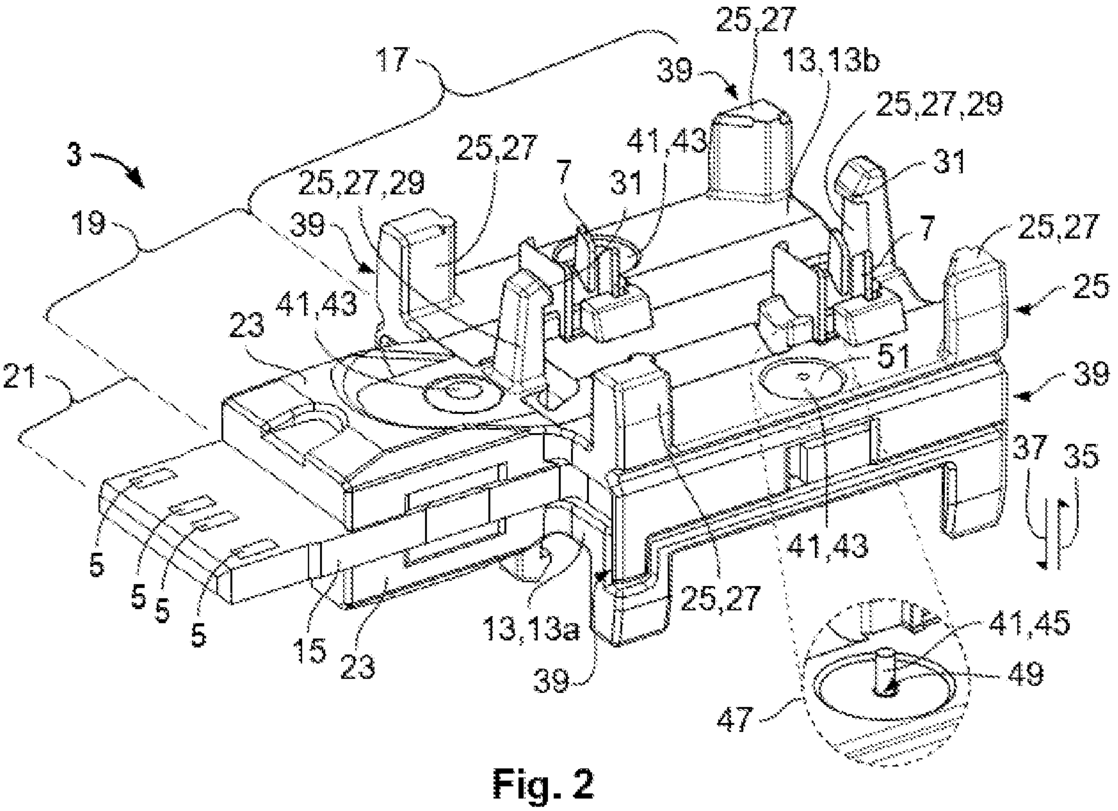
FIG. 2 is a side perspective view of a further embodiment of a plug insert body of a plug insert according to the present disclosure.

Referring to FIG. 2, a further embodiment of the plug insert body 3 is shown. The features of the embodiment of FIG. 2 are included in the embodiment(s) of FIGS. 3-9. Further, the embodiment of the plug insert body 3 shown in FIG. 1 may be combined with any of the subsequently described additional technical features. The plug insert body 3 shown in FIG. 2 comprises two adaptor plates 13 in between which a circuit board 15 is arranged. The plug insert body 3 comprises a cable termination portion 17, a stabilizing portion 19 and a contacting portion 21. The IDCs 7 are arranged in the cable termination portion 17. The stabilizing portion 19 represents a portion in which the PCB 15 is stabilized by two protrusions 23 of the two adaptor plates 13. In the contacting portion 21 the contact members 5 are provided to the outside of the plug insert 1. In this embodiment, four IDC 7 are provided, with two held and positioned by the lower adaptor plates 13*a*. Accordingly, the upper adaptor plate 13*b* is arranged on the opposite side of the PCB (the circuit board 15 may be referred to as PCB 15). The labeling "upper" and "lower" is arbitrary and may be replaced by a first adaptor plate 13*a* and a second adaptor plate 13*b*.

The plug insert body 3 comprises a guiding assembly 25 which comprises six guiding posts 27. In the first embodiment of FIG. 1, the plug insert body 3 comprises six guiding posts in total, wherein the second embodiment of FIG. 2 comprises six guiding posts 27 per adaptor plate 13 (i.e., twelve guiding posts 27 in total). Two of the guiding posts 27 further comprise latching means 29. The latching means 29 have a latching beak or protrusion 31 which may interact with a counter latching means 33 provided at the wire manager module 9 (see FIG. 1). In the embodiments shown, the six guiding posts 27 per adaptor plate 13 extend away from the plug insert body 3, respectively from the corresponding adaptor plate 13 (in the second embodiment) and towards the wire manager module(s) 9.

Accordingly, in the second embodiment shown in FIGS. 2-9, six guiding posts 27 extend away from each side of the circuit board 15. In other words, six guiding posts 27 extend upwards from the upper adaptor plate 13*b* and another six guiding posts 27 extend downwards from the lower adaptor plate 13*a*. The labeling upper and lower is arbitrary in view of the orientation shown in the figures and does not limit the invention to exactly this orientation. The upward direction 35 and the downward direction 37 are indicated in FIG. 2. Four of the six guiding posts 27 per side are arranged or located in the corners 39 of the cable termination portion 17.

Still referring to FIG. 2, heat staking or stacking members 41 are shown in a processed state 43. An unprocessed state 45 of the heat stacking members 41 is shown in a circle 47. Such an unprocessed heat stacking member 41 extends through a hole 49 in the corresponding adaptor plate 13 and is heated and melted by a tool (not shown), thereby forming a head 51 of the heat stacking member 41 in the processed state 43. This head 51 attaches the two adaptor plates 13 to the circuit board 15. The heat stacking member 41 may be provided as a separate piece or may be formed monolithically with one of the lower adaptor plate 13*a* and/or the upper adaptor plate 13*b*. The circuit board 15 provides corresponding holes (not shown) to allow passage of the heat stacking member 41 therethrough.

In all embodiments shown, each IDC 7 comprises two opposing IDC blades 53 which may also be referred to as insulation cutter members. The IDCs 7 further comprise a cable cutter member 55. The insulation cutter members 53 are configured to cut through an insulation of a cable or wire and to electrically contact the core of said cable or wire. The cable cutter member 55 is configured to cut excess cable or wire. This will be briefly explained with reference to FIG. 7 below.

Figure 3:
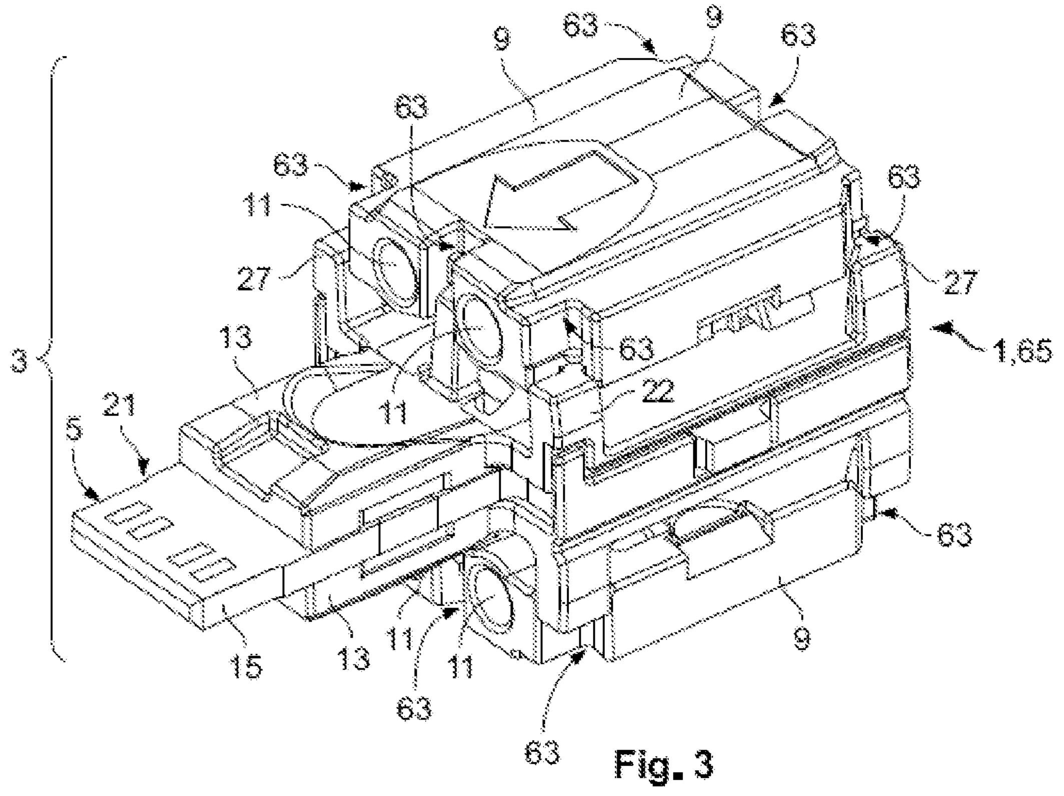
FIG. 3 is a side perspective view of a further embodiment of a plug insert.
Figure 4:
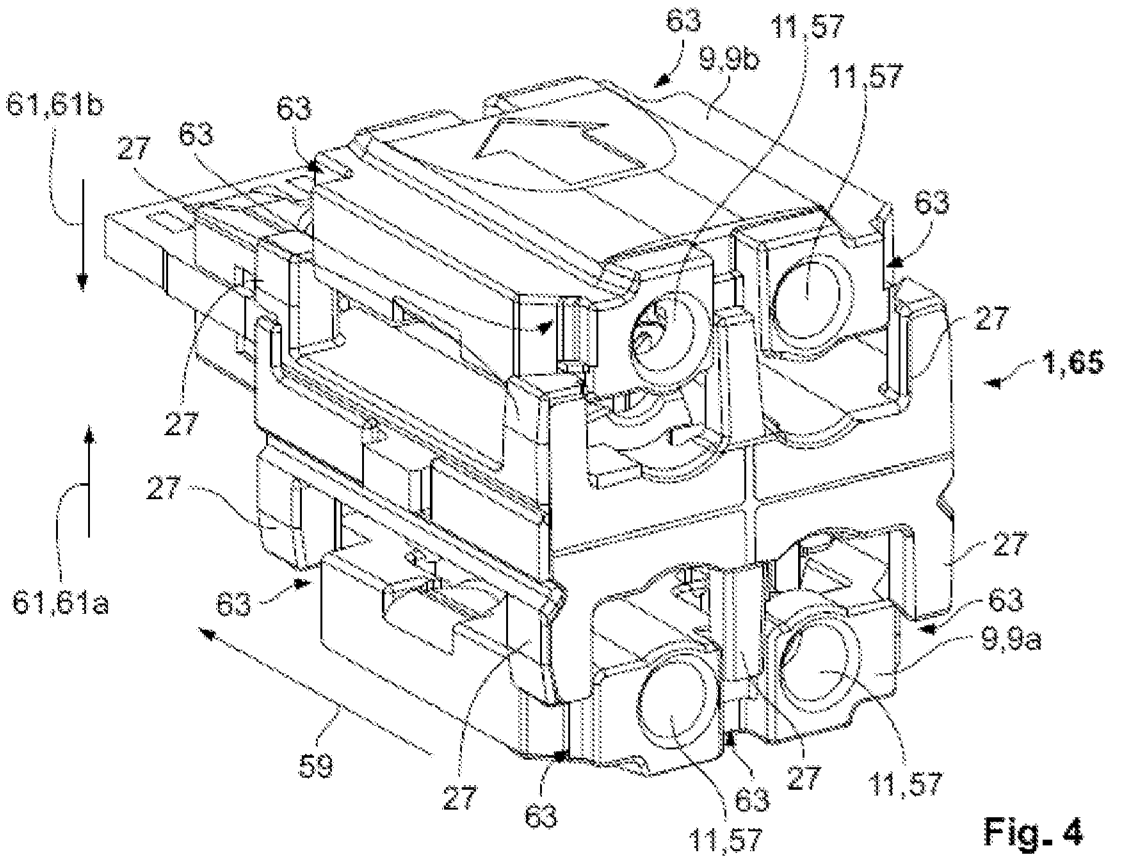
FIG. 4 rear perspective view of the plug insert of FIG. 3.

Referring now to FIG. 3 and FIG. 4, an embodiment of the inventive plug insert 1 is shown in two different perspective views. The plug insert 1 comprises the plug insert body 3 of FIG. 2, which is comprised of the circuit board 15, the two opposing adaptor plates 13 and two wire manager modules 9 in between which the plug insert body 3 is located.

In the embodiment shown, each of the two wire manager modules 9 provide two cable receptacles 11, with each receptacle receiving one cable or wire (not shown). A corresponding number of contact members 5 are provided in the contacting portion 21 of the plug insert 1. As can be seen from the figures, the cable receptacles 11 (best seen in FIG. 4) represent a tube-like structure 57, which is embodied with a straight or linear profile, i.e. without any curvature or bent sections. In different embodiments, such curvatures or bent sections may be present. Thus, a straight cable or wire may be received without the need of bending said cable or wire.

The cable receptacles 11 define a cable insertion direction 59. The wire manager modules 9 are movable along an assembly direction 61 which is oriented perpendicular to the cable insertion direction 59. Each wire manager module 9 has its own assembly direction 61, which is identical to the upward direction 35 for a lower wire manager module 9*a*, and which is identical to the downward direction 37 for an upper wire manager module 9*b* (the upward 35 and downward direction 37 are shown in FIG. 2). Accordingly, a first assembly direction 61*a* and a second assembly direction 61*b* may be defined, which are directed opposite and parallel to each other.

The guiding posts 27 are each received in a corresponding guiding recess 63, which is (in the embodiment shown) provided in the wire manager modules 9. In FIG. 3 the nine visible guiding recesses 63 are indicated. In different embodiments, the guiding recess 63 may be provided in the adaptor plate 13 and a corresponding guiding post 27 may be provided in the wire manager module 9. Each of the adaptor plates 13 or the wire manager modules 9 may comprise both guiding recesses 63 and/or guiding posts 27. The same applies to the first embodiment shown in FIG. 1 with only one wire manager module 9. The guiding posts 27 are slidingly guided by the corresponding guiding recess 63. As mentioned above, all six guiding posts per side of the plug insert 1 are guiding the wire manager module 9 from the pre-assembled a pre-assembly position 65 to an assembly position 67 (see FIGS. 8 and 9).

Figure 5:
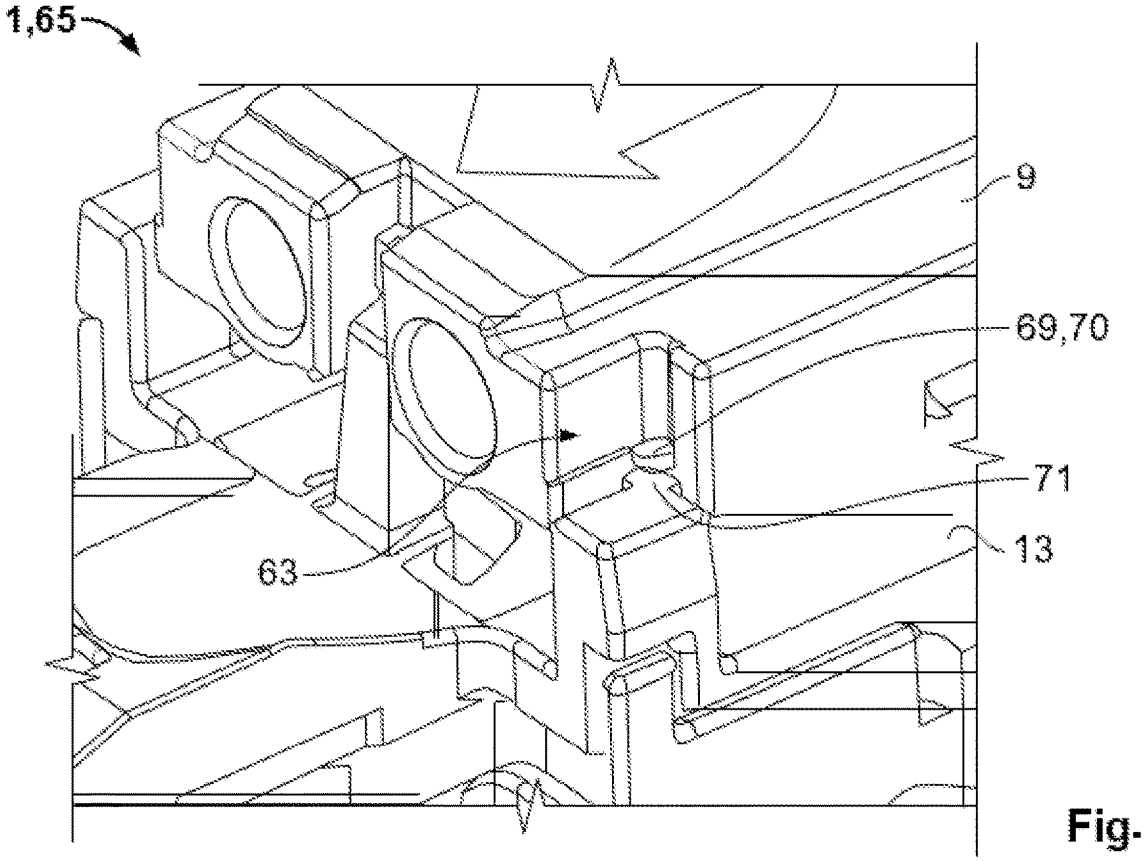
FIG. 5 the plug insert of FIG. 3 and FIG. 4 in a detailed view.
Figure 6:
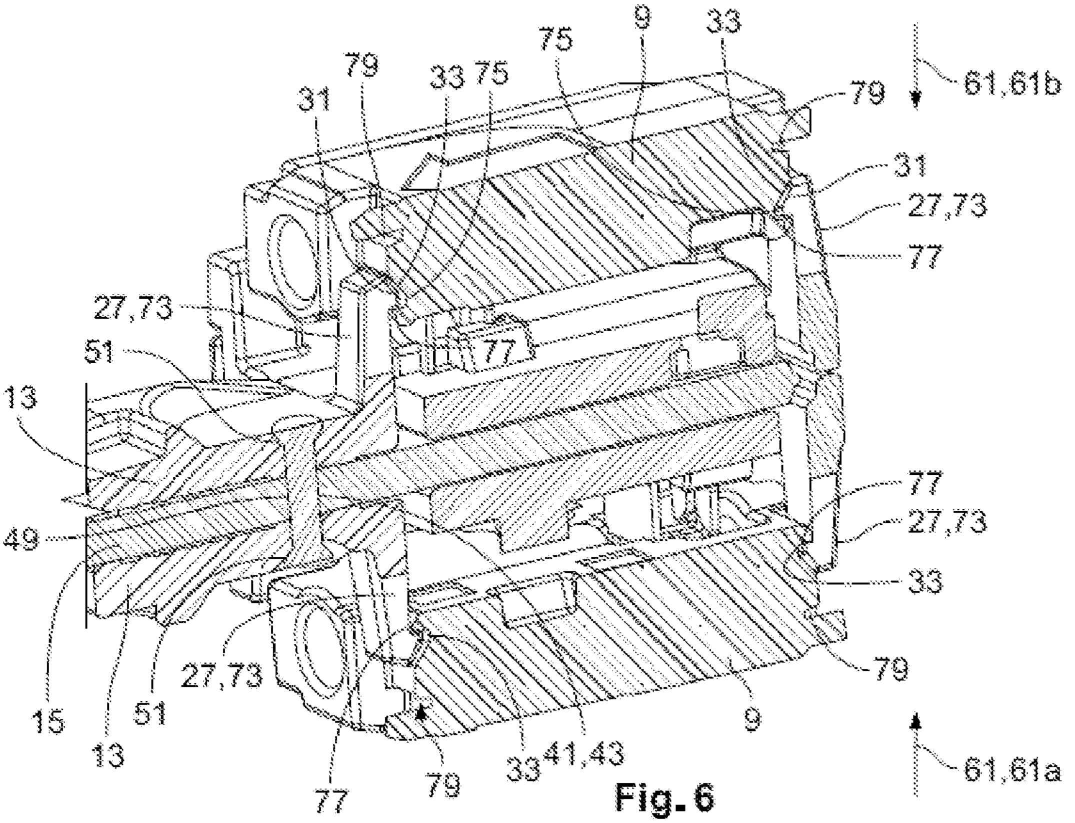
FIG. 6 a cross-sectional view of the embodiment of the plug insert of FIGS. 3 and 4 showing the detail of FIG. 5.

Further details of the guiding assembly 25 are shown with reference to FIG. 5 and FIG. 6. As shown in FIG. 5, the guiding recess 63 of the wire manger module 9 (those details are describe with reference to only one wire manager module 9 and may be transferred to the corresponding further wire manager module 9) comprises a stopping member 69, which is in abutment with a counter stopping member 71 of the corresponding adaptor plate 13. The stopping member 69 (which may also be called stopper rib) prevents a manual transfer from the pre-assembly state or pre-assembly position 65 into the assembly or assembled position 67 by hand. When the assembly position 67 is reached, the stopping member 69 is broken and may act as an indicator for an already installed plug insert 1. The stopping member 69 is located in a guiding corner 63*a* of the guiding recess 63. The stopping member 69 represents a mechanical limit stop 70. The stopping element 69 comprises a predetermined breaking point 69*a*. At this predetermined breaking point 69*a* the material of the stopping element 69 may be weakened by mechanical, thermal or chemical processing. Here, the stopping element 69 will break when the cable manager module 9 is moved further towards the plug insert body 3.

Further details of the present embodiment are shown in the cut-away view of FIG. 6. Here, two of the six guiding posts 27, namely latching posts 73, per adaptor plate 13 are in engagement with a corresponding counter latching member 33 of the wire manager module 9. The counter latching means 33 of the wire manager modules 9 comprise a recess 75 into which the latching beak 31 is inserted in the pre-assembly position 65. The latching beak 31 abuts a planar surface 77 of the recess 75, preventing the wire manager module 9 from being removed from the corresponding adaptor plate 13. The planar surfaces 77 are oriented perpendicularly to the assembly direction 61. The counter latching means 33 further comprise a shoulder 79. In the assembly position 67 the latching beak 31 engages with the shoulder 79 and prevents the disengaging of the corresponding wire manager module 9 from the plug insert body 3 and thus maintains the plug insert in the assembly position 67.

Figure 7:
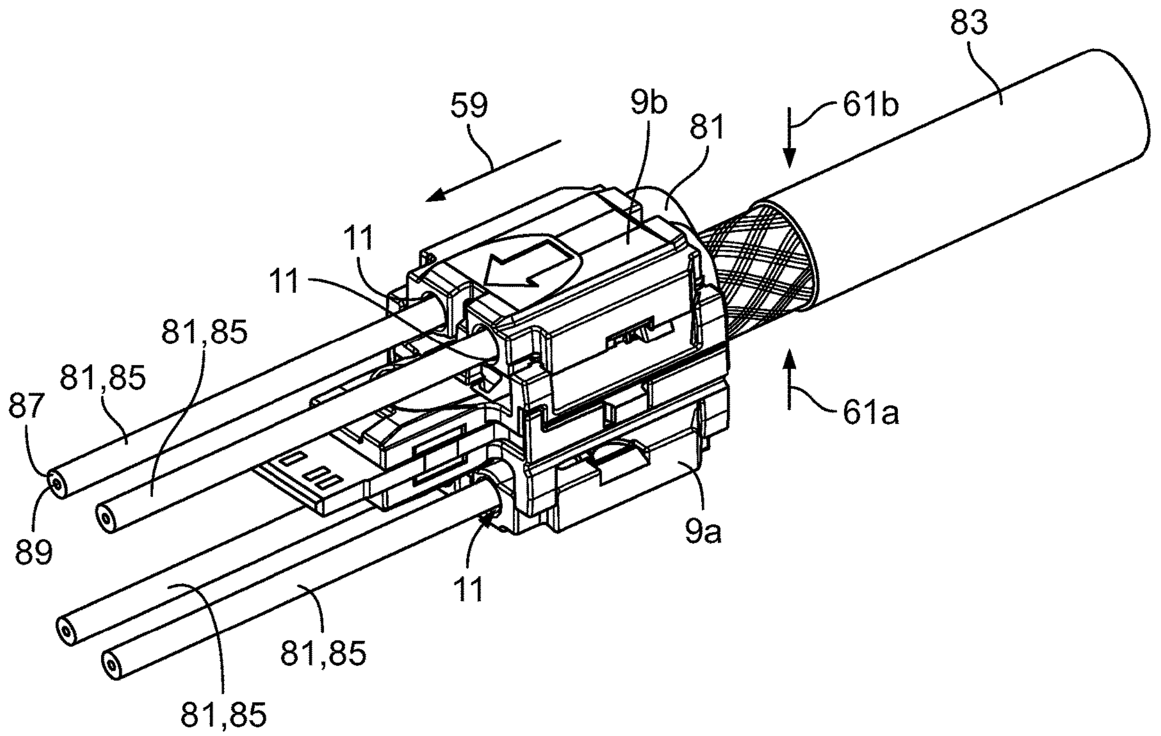
FIG. 7 is a perspective view of the plug insert with cables received therein in a pre-assembly position.
Figure 8:
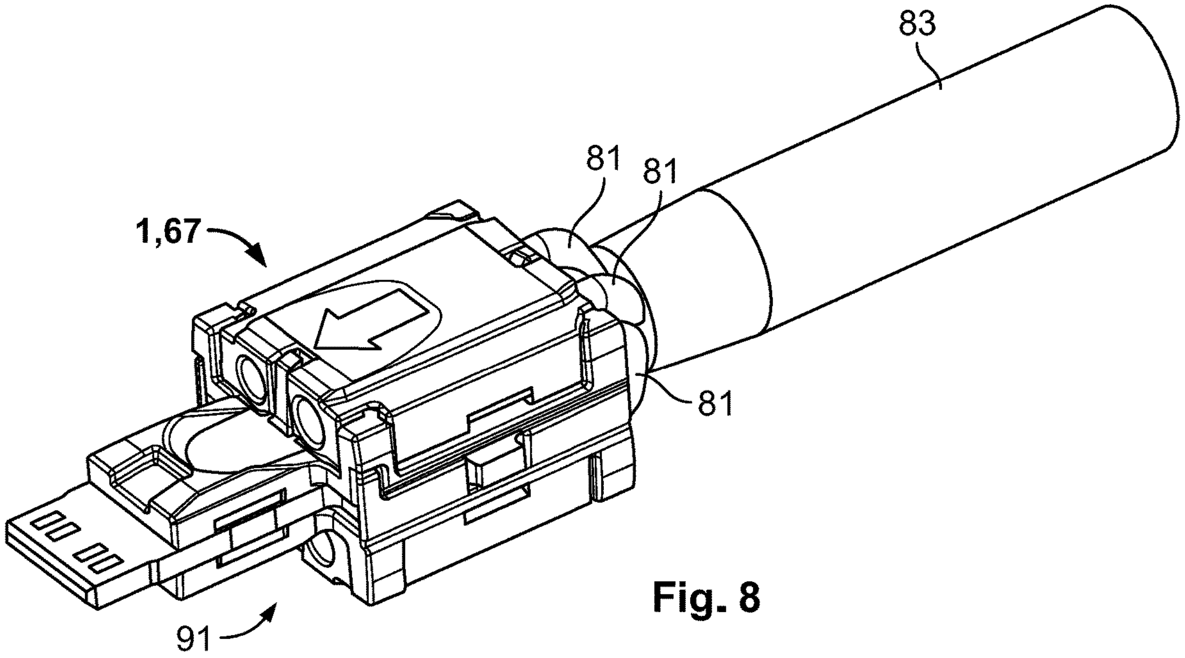
FIG. 8 a perspective view of the plug insert of FIG. 7 in an assembled position.

A process of contacting a cable or wire 81 of a data cable 83 is shown with reference to FIG. 7 and FIG. 8. After insulation is removed, four single cables or wires 81 (see FIG. 8) are inserted into the four cable receptacles 11 in the cable insertion direction 59. The portions of the cables or wires 81 which extend out of the cable receptacles 11 on the left side of the figure are excess cables 85. By application of a tool (not shown; e.g., pliers), the lower wire manager module 9*a* is moved along the first assembly direction 61*a* and the upper wire manager module 9*b* is moved along the second assembly direction 61*b*. The IDCs 7 then extend into the cable receptacles 11, thereby cutting an insulation 87 of each cable or wire 81 by means of the IDC blades 53 (see FIG. 1). At the same time, the IDCs 7 cut the access cable 85 by means of the cable cutter member 55 (see also FIG. 1). At the same time, the IDC blades 53 contact a core 89 of the cable or wire 81 and establish an electric connection therewith. This contacting and cutting takes place for all cables or wires 81, preferably simultaneously.

Figure 9:
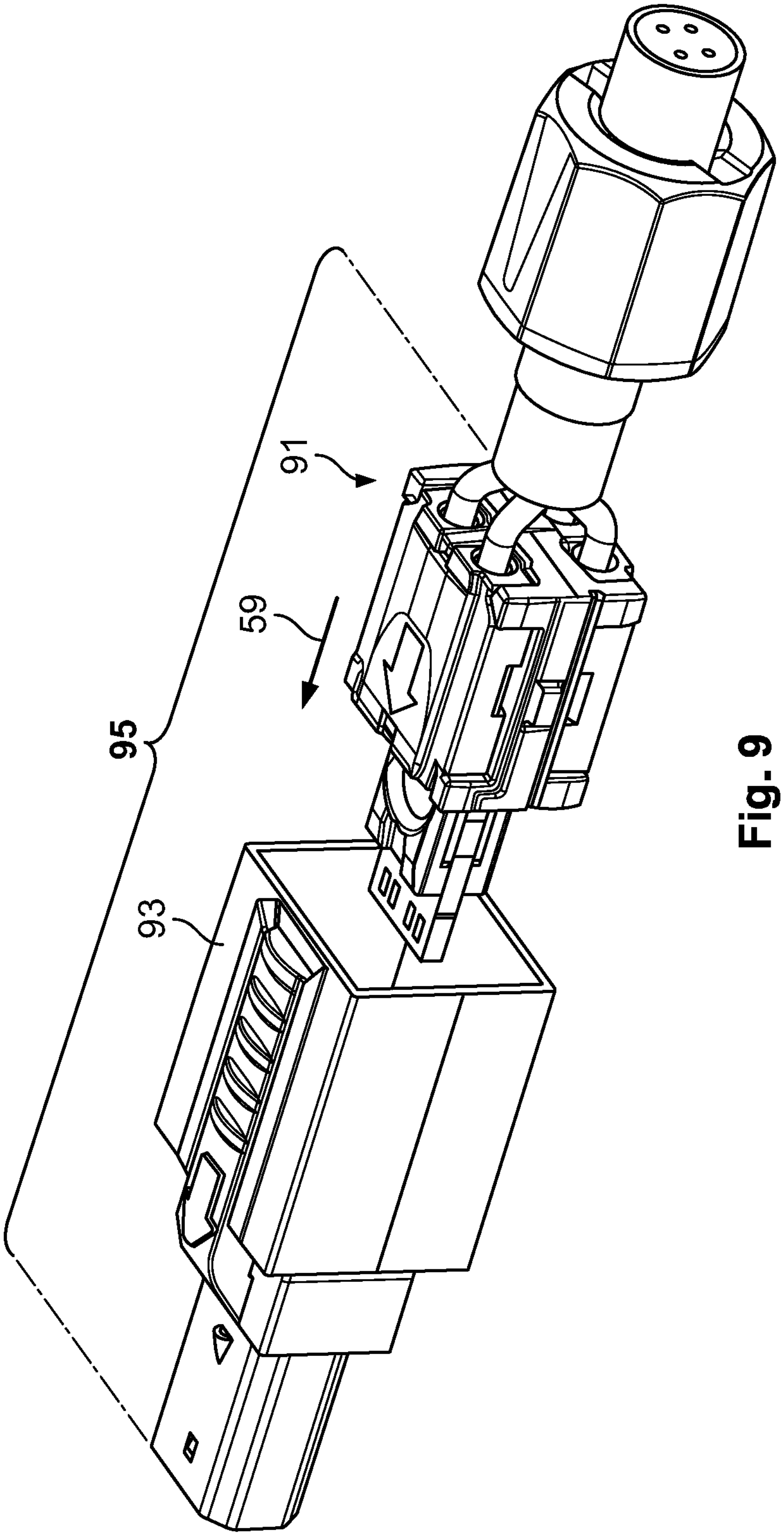
FIG. 9 is a perspective view of a connector assembly including the plug insert according to embodiments of the present disclosure.

In FIG. 8, the inventive plug insert 1 is shown in the assembly position 67, in which the excess cables 85 are completely cut and removed. The assembly shown in FIG. 8 may be referred to as the cable termination unit 91. Finally, said cable termination unit 91 may be received in a connector housing 93 along the cable insertion direction 59, thereby forming an inventive connector assembly 95, as shown in FIG. 9.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A plug insert adapted to be inserted into a connector assembly, comprising:
- a plug insert body, including:
  - at least one contact member accessible from outside the plug insert; and
  - at least one insulation displacement contact electrically connected to the contact member;
- a guiding assembly; and
- at least one wire manager module including at least one cable receptacle for receiving and holding a cable or wire, the guiding assembly guiding the wire manager module relative to the plug insert body from a pre-assembly position, to an assembly position in which the insulation displacement contact extends into the cable receptacle, the wire manager module is latched to the plug insert body in the pre-assembly position, the at least one wire manager module includes at least one stopping member blocking movement of the wire manager module towards the plug insert body from the pre-assembly position, the at least one stopping member is broken in the assembly position by motion of the wire manager module.

2. The plug insert according to claim 1, wherein the guiding assembly includes at least one guiding post on the wire manager module or on the plug insert body.

3. The plug insert according to claim 2, wherein the at least one guiding post is slidingly engaged in a guiding recess.

4. The plug insert according to claim 3, wherein the at least one stopping member is located in a corner of the guiding recess.

5. The plug insert according to claim 1, wherein the at least one stopping member comprises a predetermined breaking point at which the at least one stopping member is broken off when moving the wire manager module from the pre-assembly position to the assembly position.

6. The plug insert according to claim 1, wherein the plug insert body includes two adapter plates having a circuit board arranged therebetween.

7. The plug insert according to claim 6, wherein the two adapter plates are identical.

8. The plug insert according to claim 6, wherein the two adapter plates are heat staked to each other.

9. The plug insert according to claim 1, further comprising two wire manager modules, the plug insert body is arranged between the two wire manager modules.

10. The plug insert according to claim 1, wherein the insulation displacement contact includes an insulation cutter member adapted to cut through the insulation of the cable or wire and a cable cutter member adapted to cut off an excess length of the cable or wire.

11. The plug insert according to claim 1, wherein the at least one cable receptacle extends along a cable insertion direction, the wire manager module moved from the pre-assembly position to the assembly position in a direction perpendicular to the cable insertion direction.

12. A connector assembly, comprising:
- a plug insert, including:
  - a contact member accessible from outside the plug insert; and
  - an insulation displacement contact electrically connected to the contact member;
  - a guiding assembly; and
  - a wire manager module including a cable receptacle for receiving and holding a cable or wire, the guiding assembly guiding the wire manager module relative to a body of the plug insert from a pre-assembly position, to an assembly position in which the insulation displacement contact extends into the cable receptacle, the wire manager module is latched to the body of the plug insert in the pre-assembly position, the wire manager module includes at least one stopping member blocking movement of the wire manager module towards the plug insert from the pre-assembly position, the at least one stopping member is broken in the assembly position by motion of the wire manager module; and a connector housing receiving the plug insert along a cable insertion direction.

13. The connector assembly of claim 12, wherein the cable receptacle extends along the cable insertion direction, the wire manager module moved from the pre-assembly position to the assembly position in a direction perpendicular to the cable insertion direction.

14. The connector assembly according to claim 12, wherein the guiding assembly includes a guiding post on the wire manager module or on the plug insert body.

15. The connector assembly according to claim 14, wherein the guiding post is slidingly engaged in a guiding recess.

16. The connector assembly according to claim 12, wherein the plug insert body includes two adapter plates having a circuit board arranged therebetween.

17. A plug insert adapted to be inserted into a connector assembly, comprising:

a plug insert body, including:

at least one contact member accessible from outside the plug insert; and at least one insulation displacement contact electrically connected to the contact member;

a guiding assembly; and at least one wire manager module including at least one cable receptacle for receiving and holding a cable or wire, the guiding assembly guiding the wire manager module relative to the plug insert body from a pre-assembly position, to an assembly position in which the insulation displacement contact extends into the cable receptacle, the wire manager module is latched to the plug insert body in the pre-assembly position, the guiding assembly includes at least one guiding post on the wire manager module or on the plug insert body, the at least one guiding post is slidingly engaged in a guiding recess, the at least one wire manager module includes at least one stopping member blocking movement of the wire manager module towards the plug insert body from the pre-assembly position, the at least one stopping member is located in a corner of the guiding recess.

* * * * *